Nov. 18, 1947.  K. F. GAUSCH  2,431,240
LANDING LIGHT
Filed July 1, 1946  2 Sheets-Sheet 2
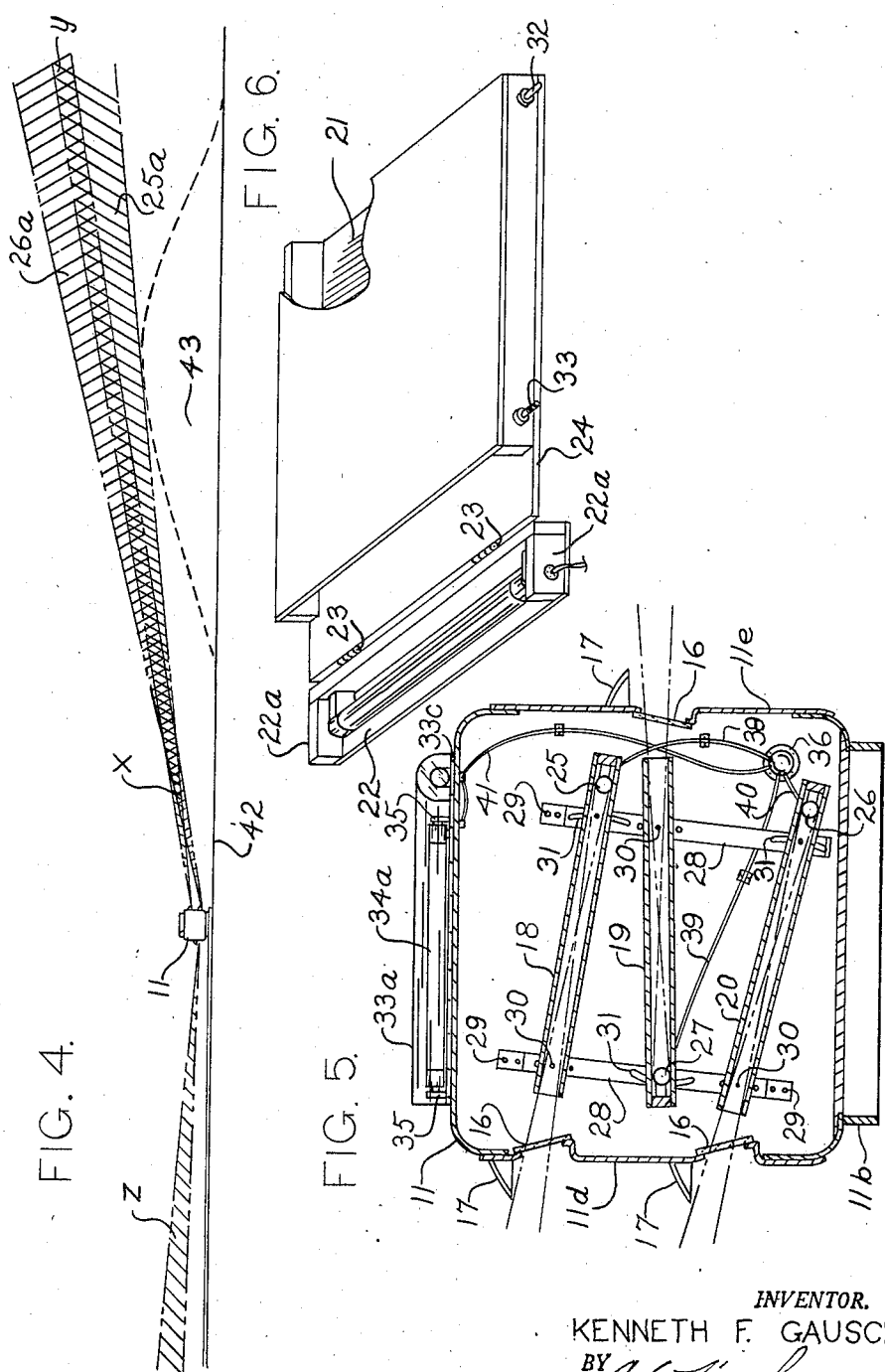
INVENTOR.
KENNETH F. GAUSCH
BY Patented Nov. 18, 1947

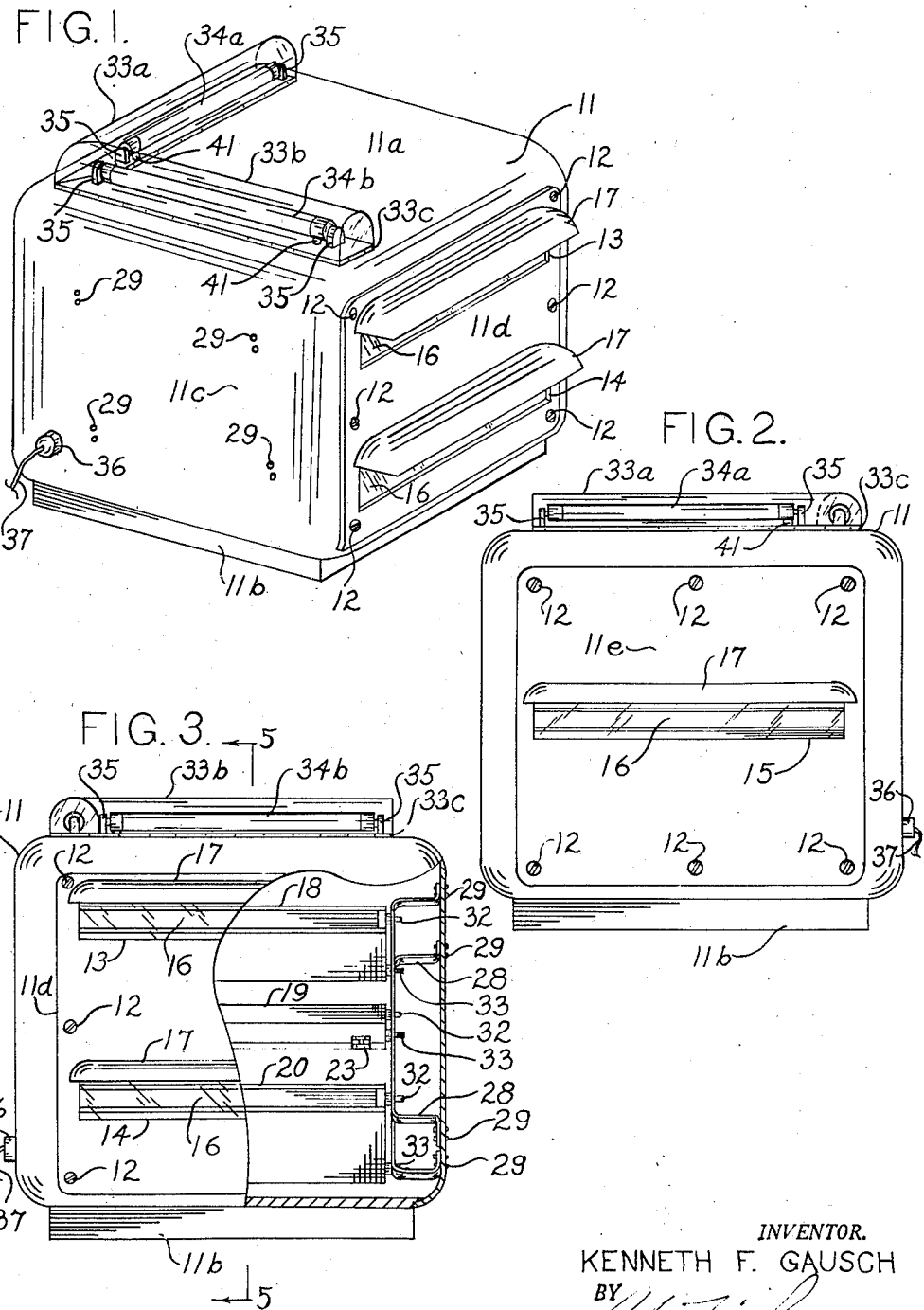

2,431,240

UNITED STATES PATENT OFFICE 2,431,240

LANDING LIGHT

Kenneth F. Gausch, St. Louis, Mo., assignor to Aviation Equipment Corp., St. Louis, Mo., a corporation of Missouri Application July 1, 1946, Serial No. 680,771

6 Claims. (Cl. 240—1.2)

This invention relates to landing lights or descent lights for airports, for aiding the pilots of airplanes in making proper landings.

The chief object of the invention is to provide a specific form of such landing light and housing therefor, the same being designed for indicating to the pilot of an incoming aircraft whether his approach to the landing run-way is at the right altitude for clearing any obstructions, and to indicate also whether his altitude of approach corresponds to that required by the length of the run-way.

Another object of the invention is to provide in a single unit the essential elements of a landing light system or assembly or apparatus, for mounting at, and incorporation with or upon a landing strip for aircraft, for indicating to the pilot of an incoming aircraft whether or not he is approaching at the right altitude for safely making his landing.

Still a further object of the invention is to provide, in a landing light apparatus of the kind referred to, a suitable housing, preferably rectangular in form and provided with removable frontal and rear facings, the frontal facing having two vertically spaced, flatly formed and laterally extended light slots therein, with rain and weather protective shields mounted along the upper margins thereof, the removable rear facing having a similar and laterally extended light slot formed and positioned on a plane extended horizontally between the horizontal planes of the light slots of the frontal facing, flat light ray projection housings mounted within the main housing, the same being open at their outer ends and arranged in parallel alignment with the light slots of the ends of the housing, the central light housing registering horizontally with the light-slot of the rear facing and the upper and lower light housings being arranged at variant angles from the horizontal, so that light rays projected through the upper and lower light housings and through the aligned light slots of the frontal facing of the main housing will intersect and cross one another at a spaced distance from the main housing and at a certain height from the ground, differently colored fluorescent or neon light tubes mounted transversely within the inner ends of the light ray projection housings, similar light tubes mounted in right angled relation for defining and indicating the outer corner of an end of the landing strip or run-way, and means for electrically energizing the said light tubes.

With the stated objects in view, together with such other objects and advantages as may appear from the specification, attention is directed to the accompanying drawing, wherein Figure 1 is a perspective view of the completely assembled and housed landing or descent light.

Figure 2 is a rear elevation of the unit as shown in Figure 1.

Figure 3 is a frontal elevation of the unit as shown in Figure 1, a portion of the housing being broken away to show the interior construction and arrangement.

Figure 4 represents in side elevation and of course on an extremely reduced scale, the layout of an airport run-way or landing strip, and showing a descent light unit as mounted at one forward corner of an end thereof, with a single, colored light beam streaming horizontally rearward along one side margin of the landing strip, and upper and lower vari-colored beams streaming forwardly and upwardly at different angles, whereby these beams intersect and cross at a predetermined distance and height, according to the adjustment of the elements.

Figure 5 is a transverse vertical section on the line 5—5 of Figure 3.

Figure 6 is a perspective view on an enlarged scale, showing a typical flat, light-ray projection housing, a portion thereof being broken out to show the interior finish.

As here shown the reference numeral 11 designates generally a descent light unit as constructed in accordance with this invention, the same comprising a rectangular housing as shown, and including a top 11a, base 11b, sides 11c, removable front facing 11d and removable rear facing 11e, these facings being removably mounted in place in any conventional manner, as by screws 12. This housing may of course be made of any desired material, but preferably of aluminum or other non-corrosive material. The removable front facing 11d is pierced by upper and lower light slots 13, 14, and the rear facing 11e by a single central light slot 15, all of these slots being flatly elongated and laterally extended in parallel relation. The slots are glazed with the glass panes 16 sloped or slanted inwardly from their upper to lower margins as shown (Figure 5) as protection against rain or snow, and as further protection hoods 17 are mounted along their upper margins (Figure 5). The panes 16 are treated to make them reflection resistant.

Mounted within the main housing 11 are the flatly formed light ray projecting housings 18, 19, 20, the same being open at their outer ends and arranged in vertically spaced relation and in parallel alignment with the light slots of the front and rear facings of the housing, the central light housing 19 in horizontal registry with the light slot 15 of the rear facing 11e, and the upper and lower light housings 18, 20, being arranged at variant angles from the horizontal so that light rays projected through them and through their aligned light openings or slots, 13, 14, in the frontal facing 11d of the main housing 11, will intersect and cross one another at a predetermined distance forwardly of the unit and at a predetermined height from the ground. Means will later be described for angularly adjusting the several light-ray projection housings, for varying the elevation and crossing of the light rays or beams. The housings 18, 19, 20, are preferably made of non-corrosive material, and the inner surfaces thereof are made reflection-proof by coating same with any conventional light absorbent finish, as indicated at 21 (Figure 6).

The inner ends of the housings 18, 19, 20, are provided with lids 22 hinged at 23 to the lower margins of these housings, for closing these end openings as desired in use, these lids having end blocks 22a adapted to seat upon the extended ends 24 (Figure 6) of the lower sides of the housings 18, 19, 20, for closing these ends for use. Between the ends blocks 22a, fluorescent or neon light tubes are mounted in conventional manner—a red tube 25 for the upper light ray housing 18, a green tube 26 for the lower housing 20, and a blue tube 27 for the central housing 19. The parts are so gauged and mounted that when the hinged ends of these housings are closed the axial lines of the fluorescent tubes coincide with planes passed centrally through the housings, the tubes equalling in diameter the inside height or clearance of the housings. Offset metal straps 28 are anchored at 29 vertically to the inner faces of the sides 11c of the housing 11, and are formed with pivot holes 30 and slots 31 as shown (Figure 5), the pivot holes 30 for engaging pivot pins 32 seated in transverse alignment in the sides of the open ends (or light ray emitting ends) of the housings 18, 19, 20, and the slots 31 for engaging the threaded stems 33 of the thumb screws, the said stems being seated in the sides of the opposite or adjustable ends of the said housings 18, 19, 20. Thus means are provided for tilting these housings vertically to any desired degree of angularity to or from the horizontal for projecting the light rays from the light tubes at corresponding angles.

Mounted on the outer side of the top 11a of the main housing 11 is a right angled Plexiglas cover or casing molded as one unit and including a pair of branches 33a, 33b, seated on base pieces 33c secured to the top. This casing is mounted nicely at one corner of the rectangular top 11a, as shown (Figure 1), and inclosed therein are a pair of white fluorescent or neon light tubes 34a and 34b seated at their ends in brackets 35 extended from the bases 33c. Inserted through one side of the casing 11 at a lower corner, is an insulated junction box 36 for the lead in wires 37 as extended from an outside source (not shown) of electric energy, for supplying current to the several light tubes through the wires 38, 39, 40, 41 (Figure 5) all in conventional manner.

In practice, one or more of these descent light units, as may be required, are mounted at the end or ends of the landing strip 42 (Figure 4), on the side margins thereof, with the front of the unit or units facing outward in the direction whence any aircraft might approach the landing strip 42 and with the angled tubes 34a, 34b disposed or turned so as to correspond with the corner of the strip and thus to indicate the general lay-out of the strip. As here shown a vertical obstruction is indicated at 43 at the approach to the landing strip. Accordingly, the upper light ray projection housing 18 is adjusted so that the red light beam 25a from the red tube 25 will fully clear the top of the obstruction 43, and the lower light ray projection housing 20 is adjusted so that the green light beam 26a from the green tube 26 will project upwardly at a greater angle from the horizontal than the beam 25a, and will intersect and cross the latter at the point marked X in the drawing (Figure 4), thus providing an intermediate or mixed light beam Y apparent at the outer ends of the beams 25a—26a. In making an approach for a night landing, the pilot's line of sight at first includes perhaps the red light beam 25a, indicating that his altitude is insufficient to safely clear the obstruction 43, or if the pilot's line of sight lies in the field of the green beam 26a, he knows that his altitude is too great. The pilot therefore alters his altitude until his line of sight includes both the red and the green rays of light as indicated at Y. He then knows that he is approaching the landing strip at the right height and at the proper distance from the run-way of the strip for making a perfect landing.

As an additional aid in the completion of a normal landing, the pilot upon passing over the descent light 11 in the final portion of his approach, will be guided by the blue beam 3 as projected inwardly from the descent light unit 11, or from a similar unit located at the opposite end of the run-way. This indicates to the pilot that he should flatten out his gliding angle and assume position for landing. This final landing position being of a "stalling" nature, the upper margin of the blue beam Z should extend above the surface of the run-way only at such height as to enable a pilot upon decreasing his forward speed, to drop his aircraft to contact the run-way in accordance with usual practice.

While I have herein shown and described a particular embodiment of the invention and specific structural features thereof, this construction may be changed or varied as desired, within the scope of the appended claims.

I claim:

1. A landing light unit for an airport for guiding a pilot in landing, a main housing provided with removable frontal and rear facings, the frontal facing having two vertically spaced, flatly formed and laterally extended light slots therein, the rear facing having a similar laterally extended light slot positioned in a horizontal plane extended medially between the horizontal planes of the light slots of the frontal facing, flat light ray projection housings mounted within the main housing in parallel alignment with the light slots of the facings of the main housing, the same being open at their outer ends and provided with hinged closures at their inner ends, the central light ray projection housing registering horizontally with the light slot of the rear facing, and the upper and lower light ray projection housings being adjustably positionable at variant angles relative to the horizontal, so that light rays projected through these upper and lower light ray projection housings with the latter set at converging angles forwardly, will pass through the aligned light slots of the frontal facing of the main housing, will intersect and cross each other at a predetermined spaced distance from the main housing at a predetermined height from the ground, and differently colored light tubes mounted lengthwise along the inner sides of the hinged closures of the inner ends of said light ray projection housings.

2. In an apparatus according to claim 1, glazing covering the said light slots of the end facings of the main housing, and protective rain and weather hoods extended along the upper margins thereof.

3. In an apparatus according to claim 1, means for adjustably setting the said light ray projection housings within the main housing, at various degrees of angularity relative to the horizontal.

4. In an apparatus according to claim 1, light ray tubes mounted in right angled relation atop the main housing, for defining and indicating the outer corner of an end of a landing strip whereon the unit is correspondingly located.

5. In combination with the landing strip of an airport, a landing light unit for mounting at a corner thereof, the same comprising a main housing provided with removable frontal and rear facings, the frontal facing having two vertically spaced, flatly formed and laterally extended light slots therein, the rear facing having a similar laterally extended light slot positioned in a horizontal plane extended medially between the horizontal planes of the light slots of the frontal facing, flat light ray projection housings mounted within the main housing in parallel alignment with the light slots of the facings of the main housing, the same being open at their outer ends and provided with hinged closures at their inner ends, the central light ray projection housing registering horizontally with the light slot of the rear facing, and the upper and lower light ray projection housings being adjustably positionable at variant angles relative to the horizontal, so that light rays projected through these upper and lower light ray projection housings with the latter set at converging angles forwardly, will pass through the aligned light slots of the frontal facing of the main housing, will intersect and cross each other at a predetermined spaced distance from the main housing at a predetermined height from the ground, and differently colored light tubes mounted lengthwise along the inner sides of the hinged closures of the inner ends of said light ray projection housings.

6. In an apparatus according to claim 1, the inner facings of the flat, light ray projection housings being coated with a reflection-proof material.

KENNETH F. GAUSCH.

REFERENCES CITED

The following references are of record in the file of this patent:

UNITED STATES PATENTS

| Number | Name | Date |
|---|---|---|
| 1,192,876 | Ebeling | Aug. 1, 1916 |
| 1,815,831 | Cassetty et al. | July 21, 1931 |
| 2,117,099 | Maly | May 10, 1938 |
| 2,282,208 | Parsberg | May 5, 1942 |
| 2,386,268 | Roper | Oct. 9, 1945 |